Oct. 10, 1961 R. E. CLAFLIN, JR., ET AL 3,004,204

CARRIER TYPE AMPLIFIER

Original Filed Oct. 11, 1957 2 Sheets-Sheet 1

INVENTORS
Raymond E. Claflin Jr.
Roderic J. Procaccino
BY
Blair Spencer & Buckles
ATTORNEYS INVENTORS
Raymond E. Claflin Jr.
Roderick J. Procaccino
BY
Blair Spencer & Buckles
ATTORNEYS

United States Patent Office 3,004,204
Patented Oct. 10, 1961

3,004,204
CARRIER TYPE AMPLIFIER

Raymond E. Claflin, Jr., Bedford, and Roderic J. Procaccino, West Acton, Mass., assignors to The Oilgear Company, Waltham, Mass.

Original application Oct. 11, 1957, Ser. No. 689,648, now Patent No. 2,973,468, dated Feb. 28, 1961. Divided and this application May 17, 1960, Ser. No. 29,743
8 Claims. (Cl. 318—257)

Figure 1:
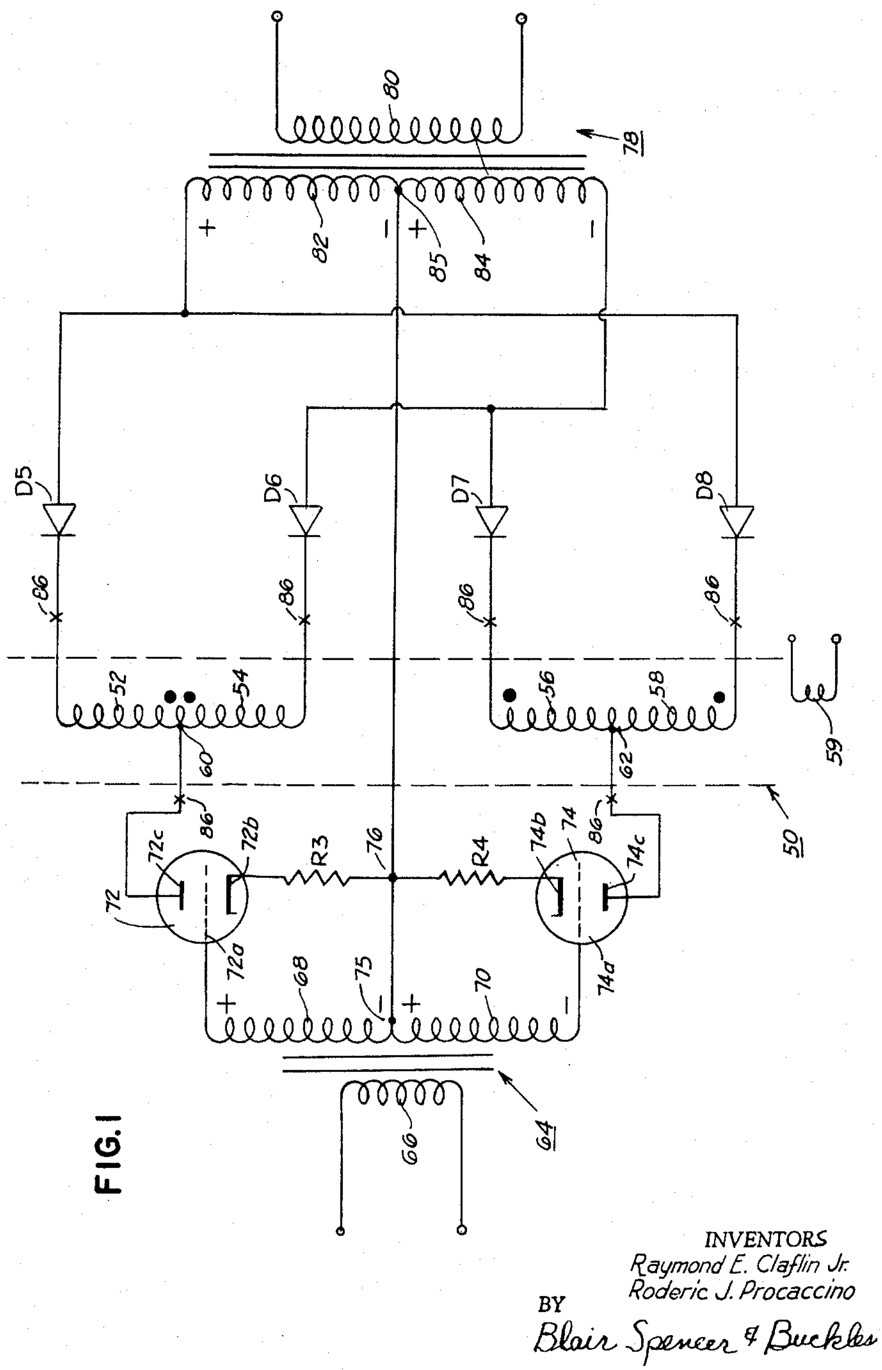

This invention relates primarily to improved electronic output circuits which may be used to advantage in carrier type servo systems to provide a reversible mechanical output whose direction and magnitude depends on the phase and amplitude of an A.-C. input signal. More particularly, it relates to highly efficient amplifiers and amplifier-demodulator systems providing mechanical outputs in response to electrical inputs in which the output is identically zero for a zero input signal.

This is a divisional application of our prior copending application Serial No. 689,648, filed October 11, 1957.

Our invention is of particular utility in servo systems having mechanical outputs controlled and, in some cases, powered by electrical amplifiers. These systems utilize electrical-to-mechanical transducers, e.g., conventional motors, torque motors, force motors, etc., to convert the electrical signals from the amplifiers to mechanical control or output motions. The input of such an amplifier is generally in the form of an amplitude-modulated suppressed-carrier signal, the magnitude of the mechanical output being determined by the amplitude of the carrier and the direction by its phase.

The use of a carrier requires demodulation of the signal. When direct-current transducers are used, demodulation is generally accomplished in the amplifier; in an A.-C. transducer, demodulation is an inherent function of the transducer itself, which converts the alternation current or voltage input into a unidirectional mechanical output.

Prior to our invention, many servo power amplifiers have been operated in the class A region with plate efficiencies no greater than 25 percent and with relatively large quiescent currents requiring oversize tubes and output elements; other amplifiers designed for class B operation may have an efficiency of up to 60 percent. Even the latter figure, however, results in a plate power waste of 40 percent in vacuum tubes so operated. On the other hand, present day requirements dictate minimum size and weight for both amplifier and power supply.

A desirable characteristic of present day electronic systems is interchangeability of the various units incorporated therein. Thus, it is desirable to keep the number of different components to a minimum to simplify maintenance problems and reduce the required number of spare or replacement units. Interchangeability also reduces manufacturing and storage costs, since only one unit need be designed and built for a number of different functions. Therefore, it is desirable that a servo amplifying unit be capable of driving both direct-current and alternating-current transducers; prior to our invention, amplifiers have not been provided having such interchangeability.

Accordingly, it is an object of our invention to provide an improved output circuit adapted to furnish a mechanical output from a modulated-carrier electrical input.

It is a further object of our invention to provide a circuit of the above character capable of efficient operation with electro-magnetic output elements.

A further object of our invention is to provide a circuit of the above character incorporating an alternating-current transducer.

Yet another object of our invention is to provide an alternating-current transducer for use as an output element in a circuit of the above character.

Yet another object of our invention is to provide an amplifier of the above character having improved efficiency.

A further object of our invention is to provide an improved demodulator for use in circuits of the above character and capable of passing modulation frequencies higher than those of comparable prior systems.

Other objects of the invention will in part be obvious and will in part appear hereinafter.

The invention accordingly comprises the features of construction, combinations of elements, and arrangements of parts which will be exemplified in the constructions hereinafter set forth, and the scope of the invention will be indicated in the claims.

Figure 2:
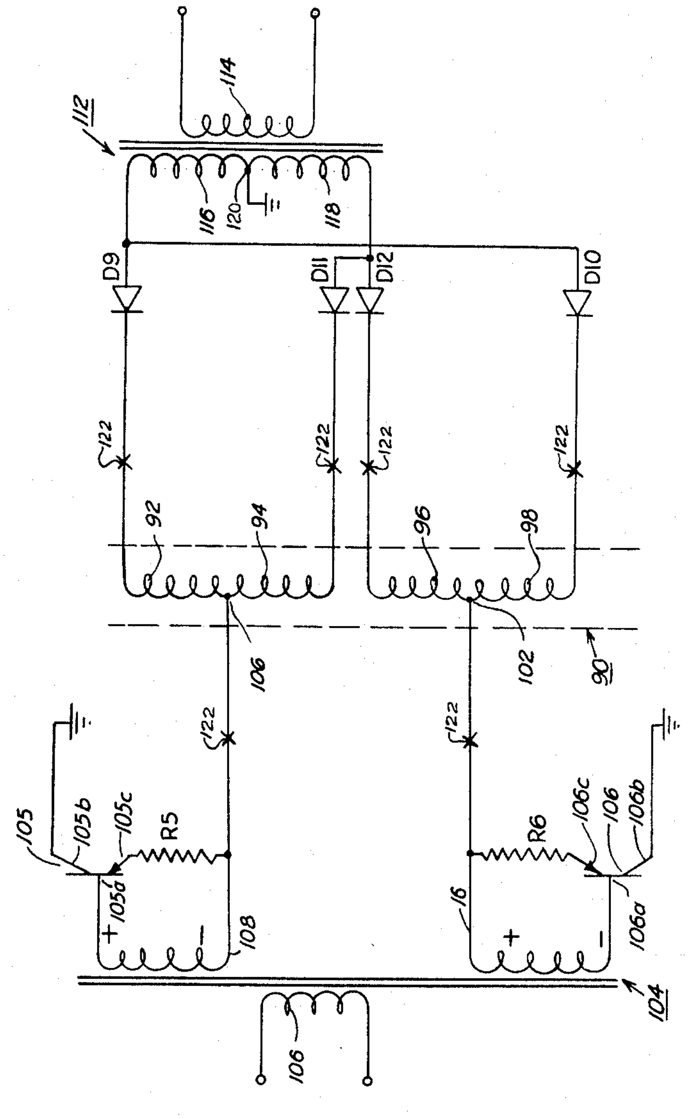

For a fuller understanding of the nature and objects of the invention, reference should be had to the following detailed description taken in connection with the accompanying drawings, in which:

FIGURE 1 is a schematic diagram of an alternating-current output circuit made according to our invention and incorporating vacuum tubes as amplifying elements, and FIGURE 2 is a schematic diagram of an output circuit incorporating p–n–p transistors connected in a grounded collector arrangement.

Similar reference characters refer to similar parts throughout the several views of the drawings.

In general, our amplifier utilizes control and amplifying elements such as tubes or transistors biased to operate in the class B region. Thus, in addition to their usual amplifying function, they serve like switching elements, keyed on or off by alternate half cycles of the input signal. The plate or collector voltages for the control elements are derived unfiltered through full-wave rectification of a reference signal with which the input signal is compared in phase to determine the direction of the mechanical output of the circuit. Half cycles of the reference signal are applied to each amplifying element alternately through two windings formed on the same magnetic core, these windings being field or armature windings appropriate to the output transducer.

The transducer windings electrically connected in the circuit are arranged in a flux-aiding relationship, and, thus, at zero input signal the flux has a direct component and an alternating component whose lowest component frequency is twice that of the reference signal. Since armature displacement is effected by interaction of the magnetic fields developed in these windings with the field developed in another winding energized by the reference voltage, none of these components provides a net desired mechanical output. With a finite input signal, one or the other of the windings, depending on the phase relationship, develops a pulsating unidirectional flux which has an alternating component at the frequency of the reference signal, and motor action ensues. The phase of this flux component, and therefore also the direction of the mechanical output, again depend upon the phase of the input signal.

In practice, our circuits have a second similarly connected amplifying element arranged in a push-pull relationship to provide greater efficiency. This novel arrangement provides other substantial advantages to be described.

An important advantage of our invention lies in the fact that, during each conduction period, the plate or collector supply voltage has the same wave form as the input signal, and this provides an efficiency materially greater than that of conventional class B circuits.

In FIGURE 1 we have illustrated a servo output circuit utilizing vacuum tubes as control and amplifying elements and an A.-C. motor for mechanical output. Thus, an A.-C. motor generally indicated at 50 has two pairs of balanced control windings 52 and 54, and 56 and 58. A reference winding 59, connected to a reference voltage source (not shown), develops flux which interacts with that of the control windings to provide motor action. As indicated by the polarity dots adjacent thereto, the control windings in each pair develop magnetic fields in the same direction along common flux paths for currents passing through them to the junctions 60 and 62.

The signal input to the circuit of FIGURE 2 is applied to a transformer generally indicated at 64 having a primary winding 66 and a center-tapped secondary with windings 68 and 70. Windings 68 and 70 may be connected directly to the grids **72*a* and 74*a* of two suitable vacuum tubes 72 and 74 whose plates 72*c* and 74*c* are connected to junctions 60 and 62; a center tap 75 is connected to a common point 76. Plate power for tubes 72 and 74 is supplied through the windings of motor 50 by a transformer generally indicated at 78 whose primary winding 80 is connected to the reference voltage source. Transformer 78 has a center-tapped secondary comprising windings 82 and 84. The center tap 85 thereof is returned to point 76, and the other ends of the windings are connected to motor windings 52, 54, 56 and 58 through diodes D5, D6, D7 and D8. These diodes are arranged to pass current in the direction of conduction of tubes 72 and 74. Cathode resistors R3 and R4, connected between point 76 and the cathodes 72*b* and 74*b*** of the tubes, complete the grid and plate circuits thereof.

In operation, the plate currents of tubes 72 and 74 are passed through one and then the other of the diodes connected thereto during alternate half cycles of the reference voltage input applied through transformer 78. The diode conducting during any given half cycle is the one connected to the secondary winding of transformer 78 which is then positive with respect to point 76. Thus, at zero signal input the plate current of tube 72 will pass alternately through motor control windings 52 and 54 and, as seen in FIGURE 2, the currents in both windings will produce magnetic flux in the same direction. The net flux developed by the plate current of this tube will thus have a direct component to which the alternating-current motor 50 has no net response and alternating components whose lowest frequency is twice that of the supply voltage frequency; the motor is also insensitive to these higher order frequencies. Since tube 72 conducts to the same extent on each half cycle, balance, i.e., lack of a fundamental frequency component, does not depend on the tube characteristics. The operation of tube 74 at zero signal is the same as that of tube 72.

If an input signal is applied to the primary winding 66 of transformer 64, substantially all conduction through tubes 72 and 74 will take place during the half cycles when the respective grids are positive with respect to point 76. Thus, assuming the relative polarities of input and reference signals indicated by the polarity signs adjacent transformers 64 and 78, tube 72 will conduct when secondary winding 82 goes positive, and its plate current will thus pass through diode D5 and motor winding 52. These conducting pulses occur on alternate half cycles, and therefore the flux developed thereby has an alternating component whose frequency is equal to that of the reference voltage applied to motor winding 59. A net force or torque is thus developed in motor 50 to displace it in a given direction. Tube 74 conducts during the half cycle when tube 72 is cut off, and therefore its current passes through diode D7 and motor winding 56; the flux pulses developed in winding 56 are of opposite direction to those of winding 52, and therefore the net flux developed in motor 50 by the circuit of FIGURE 2 is almost entirely alternating in form and of the same frequency as the reference voltage.

Should the phase of the input voltage be reversed, the half cycles during which tubes 72 and 74 conduct will be reversed; thus, the plate current of tube 72 will pass through diode D6 and motor winding 54 and that of tube 74 through diode D8 and winding 58. The phase of the flux developed by the windings will thus be reversed with respect to that developed by the reference winding, and therefore the direction of motor output will be reversed. The magnitude of the mechanical output of the motor 50 is proportional to the amplitude of the input signal.

From the foregoing, it will be apparent that the motor 50 serves as a summing device. Its function is effectively to add the currents in each pair of control windings and subtract the total current in one pair from that in the other. The summing function is actually performed on the magnetic fields developed along a common flux path.

In FIGURE 2 we have illustrated a modification of our circuit incorporating transistors connected in a grounded collector arrangement. As shown therein, a motor generally indicated at 90 has windings in matched or balanced pairs 92 and 94 and 96 and 98, windings 92 and 94 being connected to a common junction point 100, and windings 96 and 98 being connected to a similar point 102. The directions of the fluxes developed by currents through the windings depend on whether the motor is designed for direct-current, as described in the above copending application Serial No. 688,648, or alternating-current operation, as described above. A signal input transformer generally indicated at 104 has a primary winding 106 and two balanced secondary windings 108 and 110. The secondary windings are connected between junction points 100 and 102 and bases **105*a* and 106*a* of two p-n-p transistors 105 and 106. The relative polarities of windings 108 and 110 are indicated by the polarity signs adjacent thereto (FIGURE 3) and are such as to maintain the bases of the transistors at opposite polarities relative to the respective common junction points when an input signal is applied to primary winding 106**.

Still referring to FIGURE 2, the collector supply voltages are developed through full wave rectification of the reference voltage in the same manner as in the circuit of FIGURE 1. Thus, a transformer generally indicated at 112 has a primary winding 114 for connection to the reference voltage source and a center-tapped secondary comprising windings 116 and 118. Winding 116 is connected to motor coils 92 and 98 through diodes D9 and D10, and winding 118 is connected to windings 94 and 96 through diodes D11 and D12. The diodes are arranged to conduct in the proper direction to provide reverse biasing potentials across the collector-base junctions of transistors 105 and 106. The collector circuits are completed by grounding the collectors **105*b* and 106*b* along with the center tap 120 of the secondary of transformer 112. Resistors R5 and R6, connected between junctions 100 and 102 and the emitters 105*c* and 106*c***, respectively, complete the circuits.

The operation of the circuit of FIGURE 2 is similar to that described above. At zero input signal level, successive half cycles of collector current pass through alternate motor windings in each pair thereof, with the consequent balance condition and zero output described above. When an input signal is impressed on the terminals of primary winding 106, each transistor conducts during the half cycle of the input signal in which its base is negative with respect to its emitter, and the direction of output of motor 90 depends upon the phase of the input signal relative to that of the reference voltage.

Thus, we have described a servo amplifier and demodulator circuit which has a zero mechanical output for a zero electrical input, and whose output is proportional to the magnitude of the input signal. The direction of the output is determined by the phase of the carrier. The amplifier may be connected to an A.-C. output transducer, and, by the use of a collector or plate supply voltage having the same wave form as the input signal, it may operate at efficiencies of better than 90 percent. The amplifier may use vacuum tubes or transistors in any of the basic circuit arrangements thereof. We have also described an alternating-current transducer for use in our output circuits. The circuits are compact and simple in construction.

In addition to the above features, other important advantages accrue from the use of our circuits. They respond only to carrier components in phase or 180° out of phase with the reference signal, thus rejecting the unwanted quadrature components. It will also be apparent that the output elements need not always be motors. For example, the control windings may be windings of an output transformer.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

We claim:

1. In an electrical amplifier in which the input signal is in the form of an amplitude-modulated carrier, the combination of a pair of control elements, each of said control elements having a pair of control terminals and first and second output terminals, the signals applied to said control terminals determining the electrical resistances of said elements between their respective output terminals, input means for applying said input signal to said control terminals, the signal applied to one pair of control terminals being in phase opposition to that applied to the other pair of control terminals, two pairs of impedance elements, each of said impedance elements having two terminals, means connecting a first terminal of each impedance element in one pair thereof to said first output terminal of one of said control elements, means connecting a first terminal of each impedance element in the other pair to said first output terminal of the other control element, a reference signal source connected in series with the output terminals of each of said control elements and the impedance elements connected thereto, said source being adapted to apply electrical pulses across said output terminals through said impedance elements, one pulse occurring for each half cycle of the carrier, alternate pulses passing through one of the impedance elements in each pair thereof and the remaining pulses passing through the other impedance elements, all of said pulses having the same polarity with respect to said first output terminals of said control elements, and output means including means for adding the currents in each pair of impedance elements and means for subtracting the sum of the currents in one pair of impedance elements from the sum of the currents in the other pair thereof.

2. The combination defined in claim 1 in which said impedance elements are electrical windings.

3. The combination defined in claim 1 in which said impedance elements are electrical windings, the windings in each pair having a common flux path and said output means is responsive to flux in said flux paths, said windings being so arranged that currents through the windings in each pair in the same direction with respect to the control element connected thereto produce flux in the same direction along said common path.

4. The combination defined in claim 3 in which said windings have a common flux path, the windings in each pair being so arranged that currents therethrough toward the control elements connected thereto produce flux in the same direction along said path, the pairs of windings being so arranged that the currents in one pair thereof produce flux in a direction opposite to that produced by currents in said other pair.

5. In an output circuit adapted to provide a mechanical output in response to an amplitude-modulated electrical input signal the combination of a pair of control elements, each of said control elements having a pair of control terminals and first and second output terminals, said control elements being so constructed that such signals applied to said control terminals determine the electrical resistances of said elements between their respective output terminals, input means for applying said input signal to said control terminals in such phase relationship that the resistance between one pair of output terminals is at a minimum when the resistance between the other pair of output terminals is substantially at a maximum, a motor having two pairs of control windings, each of said windings having two terminals, means connecting a first terminal of each winding in one pair thereof to said first output terminal of one of said control elements, means connecting a first terminal of each winding in the other pair thereof to said first output terminal of the other control element, a source of magnetic flux adapted to provide flux interacting with that developed in said windings by currents therein, the interaction of said fluxes producing mechanical output in said motor, a reference signal source connected in series with the output terminals of each of said control elements and the control windings connected thereto, said source being adapted to apply electrical pulses across said output terminals through said control windings with one pulse occurring for each half cycle of the carrier, said source including gating means adapted to pass alternate pulses through one of the control windings in each pair thereof and the remaining pulses through the other control windings, said flux source providing an alternating flux of the same frequency as said carrier, said control windings being so arranged that said motor responds to the difference of the sums of the currents through the control windings in each pair thereof.

6. In an output circuit adapted to provide a mechanical output in response to a modulated alternating-current electrical input signal, the combination of first and second control elements, each of said elements having a pair of input terminals and an output signal path, the impedances of said signal paths being functions of the instantaneous magnitudes of the signals applied to said pairs of input terminals, input means for applying said input signal to said pairs of input terminals in such manner that the variations of the impedances of said signal paths are in phase opposition to each other, a first set of windings comprising a first pair including first and second windings and a second pair including third and fourth windings, a second set of windings comprising a third pair including fifth and sixth windings, each of said windings having first and second terminals, the first terminal of each winding being connected to the first terminal of the other winding in the same pair, means connecting said first terminals of said first and second windings to one end of said signal path of said first control element, means connecting said first terminals of said third and fourth windings to one end of said signal path of said second control element, means connecting said first terminals of said fifth and sixth windings to the other ends of said signal paths, first and second diodes connected between said second terminals of said first and fourth windings and said second terminal of said fifth winding, third and fourth diodes connected between said second terminals of said second and third windings and said second terminal of said sixth winding, means for magnetically exciting one set of windings at the frequency of said input signal, the exciting flux being such as to provide opposite polarities of the voltages between said second and first terminals of the windings in the same pair in said excited set, a motor, the windings in the other set being control windings of said motor, said motor also having a magnetic flux source whose flux interacts with the flux of said control windings to provide mechanical output from said motor, the flux from said flux source having a unidirectional component with respect to the flux of said control windings, the senses of said control windings being such that current through each control from its second terminal toward its first terminal will cause motor output in a direction opposite to that caused by similar current in the other winding in the same pair, whereby when said input signal has the same phase as the flux in said excited set of windings current will flow through said first winding on alternate half cycles and through a winding in said second pair during every other half cycle, the current through control windings of said motor on both half cycles providing motor output in a first direction, and when said signal is in phase opposition to said excitation flux said second winding conducts on alternate half cycles and the other of said windings in said second pair conducts on every other half cycle, the current through control windings then providing motor output in a direction opposite to said first direction, said flux source being adapted to develop an alternating flux having the same frequency as said carrier, said flux source and all of said control windings having a common flux path, each of said control windings in a pair thereof developing flux in the same direction along said path for currents therethrough, the control windings in one pair developing flux in an opposite direction along said path from those in the other pair thereof.

7. In an output circuit adapted to provide a mechanical output in response to an amplitude-modulated electrical input, the magnitude of said mechanical output being proportional to the amplitude of the carrier of said input signal and the direction of the output being determined by a phase of said carrier, the combination of first and second transistors, each of said transistors having an emitter, a base and a collector, a point of reference potential, means connecting the collector of each of said transistors to said point of reference potential, a first common junction and a second common junction, an input transformer having a primary winding and two secondary windings, one of said secondary windings being connected to apply an input signal between the base of said first transistor and said first common junction, means connecting the emitter of said first transistor to said first common junction, means connecting the emitter of said second transistor to said common junction, the other secondary winding being connected to apply an input signal between said base of said second transistor and said second common junction, said secondary windings being so connected that the base-emitter current of said first transistor is in phase opposition to the base-emitter current of said second transistor, a motor having two pairs of control windings, each of said windings having two terminals, means connecting a first terminal of each control winding in each pair thereof to said first common junction point, means connecting a first terminal of each control winding in the other pair thereof to said second common junction point, the flux developed by currents through said windings effecting an output force in said motor, a reference signal source comprising a reference transformer having a primary winding and two secondary windings, each of said secondary windings having a first terminal and a second terminal, means connecting said first terminals to said point of reference potential, said second terminals of said secondary windings being in phase opposition with respect to said point of reference potential, rectifying means connected in series with each of said control windings, means connecting said second terminal of one of said reference transformer secondary windings to one control winding in each pair thereof, means connecting said second terminal of the other reference transformer secondary winding to the other control windings, said rectifying means being arranged to apply reverse bias between the bases and collectors of said transistors upon application of an alternating-current input to said primary winding of said reference transformer.

8. A motor having two pairs of control windings and a flux source, each of said control windings having two terminals, said control windings having a common flux path with said flux source, whereby the flux developed by currents in said control windings may interact with the flux from said flux source to provide an output force in said motor, and means connecting one terminal of one winding in each pair thereof to one terminal of the other winding in the same pair, the windings being so oriented that currents through each winding in a pair toward the other winding thereof develop flux in the same direction along said common flux path, currents in one pair thereof developing flux in a different direction along said path than similar currents in the other pair.

No references cited.